Figure 6:
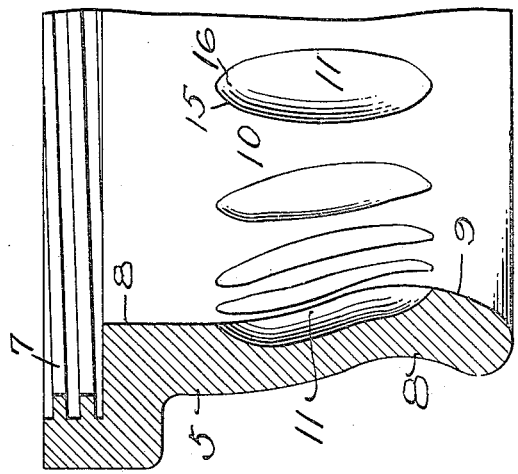

J. E. MILLIREN.
GLASS HANDLING APPARATUS.
APPLICATION FILED JAN. 22, 1912.
1,038,177.
Patented Sept. 10, 1912.
2 SHEETS—SHEET 1.
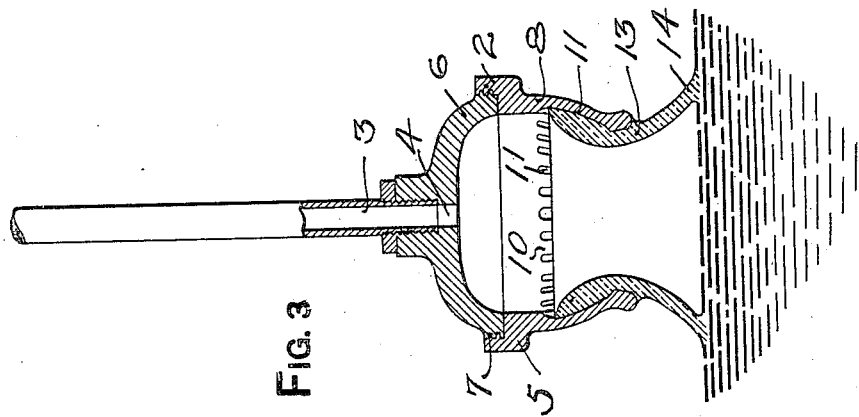
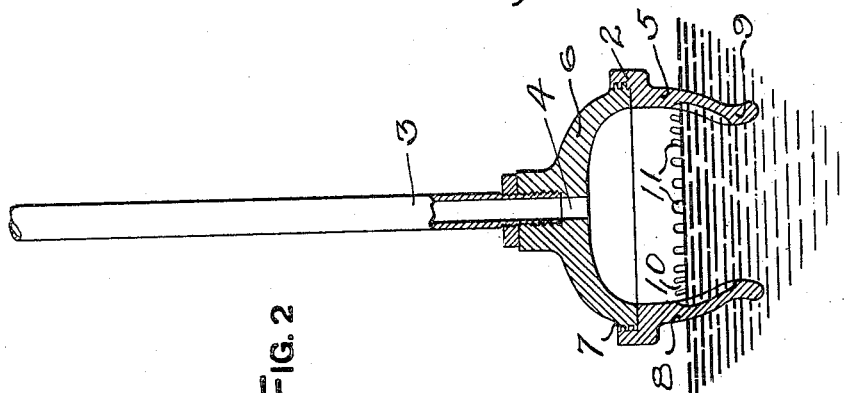
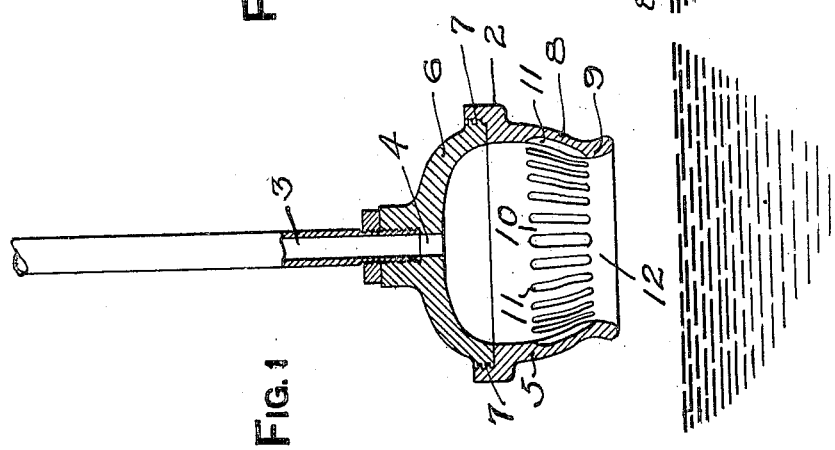
WITNESSES
INVENTOR

J. E. MILLIREN.
GLASS HANDLING APPARATUS.
APPLICATION FILED JAN. 22, 1912.

1,038,177.

Patented Sept. 10, 1912.

2 SHEETS—SHEET 2.

WITNESSES

INVENTOR

UNITED STATES PATENT OFFICE.

JOHN E. MILLIREN, OF FALLS CREEK, PENNSYLVANIA.

GLASS-HANDLING APPARATUS.

1,038,177.   Specification of Letters Patent.   Patented Sept. 10, 1912.

Application filed January 22, 1912. Serial No. 672,778.

*To all whom it may concern:*

Be it known that I, JOHN E. MILLIREN, a citizen of the United States of America, residing at Falls Creek, in the county of Jefferson and State of Pennsylvania, have invented new and useful Improvements in Glass-Handling Apparatus, of which the following is a full, clear, and exact description, reference being had to the accompanying drawings, which form part of this specification.

My invention, subject of this application, relates to the drawing of cylinders from molten glass which cylinders are subsequently split and flattened in the manufacture of sheet glass.

It has particular reference to the bait used in the drawing of the cylinder, and as such a device I provide a bait which will firmly support the cylinders under the operative strains which tend to set up fractures and working loose of the glass cylinder and falling away thereof from the bait as it is lifted. In the drawing of the cylinders the heating of the bait by absorption renders quick and perfect formation of the neck of the cylinders impossible by reason of the tendency of the glass to flow from and not set to the operative face of the bait. By my invention I aim to provide a removable operative face for the bait and thereby overcome such difficulty of non-setting or non-adherence, which, as well as other details of construction with attending advantages, will be hereinafter more fully described.

I will now describe my invention, referring to the drawings, so that others skilled in the art may understand and construct the same, it being premised, however, that many changes may be made in the construction shown without departing from my invention.

Figure 5:
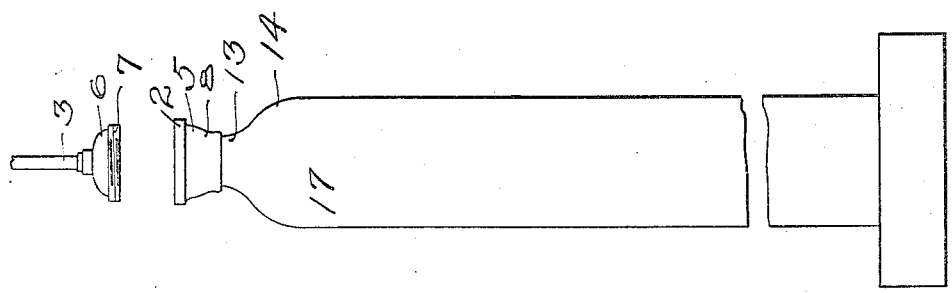
Figure 4:
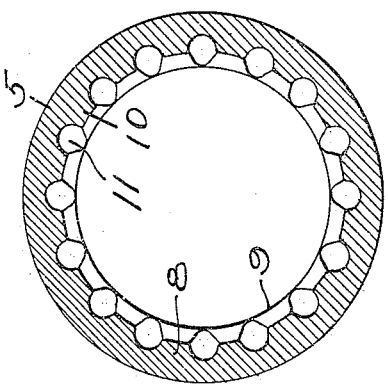

Figure 1 is a vertical sectional view of a bait embodying my invention, the same being positioned above a batch of molten glass from which the cylinder is adapted to be drawn; Fig. 2 is a similar view showing the bait lowered into the batch of glass preparatory to the drawing of the cylinder by elevation of the bait; Fig. 3 is a similar view showing the bait lifted and the initial formation of the cylinder, that is, the neck or top of the cylinder; Fig. 4 is an enlarged horizontal section on the line 4—4 of Fig. 1: Fig. 5 is an elevational view showing the cylinder and the operative lower portion of the bait attached thereto, the upper part of the bait being separated from the said lower part; and Fig. 6 is a fragmentary vertical section, showing modified shape of the vertical ribs formed on the interior face of the bait.

The bait 2 is attached, preferably, by screw-threads, to the usual pipe or tube 3 or other suitable mounting by means of which the drawing medium, such as air, may be delivered to the cylinder, the bait having the connecting air-passage 4. Comprising the bait proper 2, is the lower ring like member 5 and upper inverted cup-shaped or dome member 6, having screw threaded connection at 7, with one another. This connection 7 is such that the sections 5 and 6 may be brought by the screw-threads to a perfect seal to prevent escape of the drawing air when the cylinder is being drawn. The section 5, as will be seen, is somewhat flared or wider at the top than the bottom, the wall 8 taking the shape of a reverse curve. Such flaring form of construction enables the neck of the formed cylinder to be easily and readily ejected from the top thereof in the cleaning of the bait for another drawing operation. With the reverse curve again giving a flaring effect to the lower edge of the bait, as at 9, sharp corners, with their tendency to set up fractures, are obviated, the glass wall of the cylinder not drawing across the lower edge of the bait but, instead, taking or following the curve of the lip or flaring edge, as shown in Fig. 3. Disposed along the interior face of the member 5 are the vertical ribs 10 formed preferably by recessing the wall 8 as at 11. Tenacious engagement of the glass with the interior of the ring 5 is brought about through the medium of these ribs and recesses so that all tendency to relative rotatory movement of the glass neck and bait is prevented, while the cylinder is primarily supported for the drawing operation by the gripping effect produced by the curved formation of the wall 8.

In drawing the glass cylinder, the bait is lowered, as shown in Fig. 2, into the glass a depth sufficient to cause the glass to rise within the chamber 12 to a height preferably two-thirds the length of the ribs 10. The cool condition or low temperature of the ring 5 causes the glass, which has flowed into the recesses 11, to readily set and thereby firmly support the neck 13 and depending wall 14 as the bait rises to complete the drawing operation. After the cylinder is completely drawn it may be detached from the drawing apparatus or tube, so as to permit of its being lowered and cut into proper lengths, by separating the lower portion 5 from the top section 6 by unscrewing as is shown in Fig. 5, the drawn cylinder being indicated by the numeral 17. If it is desired to repeat the drawing operation another ring member 5 may be applied to the head or top 6 and the formation of the cylinder neck and drawing proceeded with.

A particular advantage of this separable construction of the drawing apparatus is that ring members 6 of desirable low temperature may always be used, thereby greatly expediting the production of cylinders. It also enables the detachment of the cylinder from the drawing apparatus for subsequent manipulation without liability of breakage, resulting in large saving of glass and labor.

It is desirable to so form the ribs 10 that the edges thereof present no such sharpness as would tend to set up line fractures in the neck of the glass cylinder. This is clearly shown in Fig. 4 wherein the edges are rounded. The shape of the ribs may be greatly varied as desired without departing from my invention. A modified shape is shown in Fig. 6, the ends of the ribs curving outwardly at 15 into the tapered ends of the recesses 16. It would also be no departure from my invention to form the ribs without recessing the surface as shown.

Other advantages of my invention will be appreciated by those skilled in the art.

Having described my invention, what I claim and desire to secure by Letters Patent is:

1. A glass drawing bait comprising a body portion having a dependent annular wall, the interior of which is provided with substantially upright and alternately disposed grooves and projections.

2. A glass drawing bait comprising a body portion having a depending annular wall the interior of which is provided with substantially vertically disposed projections.

3. A glass drawing bait comprising a body portion having a depending annular wall the interior of which is provided with substantially vertically disposed ribs arranged to converge toward one another at the bottom.

4. A glass drawing bait comprising a body portion having a depending annular wall the interior of which is provided with substantially vertically disposed ribs having a varying cross-sectional shape from end to end.

5. A glass drawing bait comprising a body portion having a depending annular wall the interior of which converges downwardly, and which carries a series of substantially vertically disposed ribs.

In testimony whereof, I have hereunto set my hand.

JOHN E. MILLIREN.

Witnesses:
MARY A. BARTH,
M. A. KELLER.

---

Copies of this patent may be obtained for five cents each, by addressing the "Commissioner of Patents, Washington, D. C."